United States Patent
Ulrich et al.

[11] Patent Number: 5,999,362
[45] Date of Patent: Dec. 7, 1999

[54] TAPE DRIVE WITH TRAY FOR COUNTERACTING INVERTED CARTRIDGE INSERTION

[75] Inventors: Michael H. Ulrich, Boulder; Alexander S. Johnson, Golden; Gary French, Bailey, all of Colo.

[73] Assignee: Exabyte Corporation, Boulder, Colo.

[21] Appl. No.: 09/010,131

[22] Filed: Jan. 21, 1998

Related U.S. Application Data

[60] Provisional application No. 60/036,135, Jan. 21, 1997.

[51] Int. Cl.$^6$ ................................................. G11B 15/675
[52] U.S. Cl. ........................................ 360/96.5; 242/338.2
[58] Field of Search ........................ 360/96.5; 242/338.2

[56] References Cited

U.S. PATENT DOCUMENTS

| | | | |
|---|---|---|---|
| 4,484,240 | 11/1984 | Yoshida | 360/96.5 |
| 4,573,091 | 2/1986 | Barton, Jr. et al. | 360/93 |
| 5,008,766 | 4/1991 | Chigasaki | 360/96.5 |
| 5,191,494 | 3/1993 | Lee | 360/96.5 |
| 5,239,427 | 8/1993 | Ooka et al. | 360/96.5 |
| 5,337,204 | 8/1994 | Fujii | 360/132 |
| 5,500,778 | 3/1996 | Ahn | 360/96.5 |
| 5,602,694 | 2/1997 | Miles et al. | 360/84 |
| 5,602,695 | 2/1997 | Nishijima et al. | 360/94 |
| 5,652,683 | 7/1997 | Bryer | 360/96.5 |
| 5,659,442 | 8/1997 | Ojima | 360/96.5 |
| 5,724,207 | 3/1998 | Kobayashi | 360/96.5 |

*Primary Examiner*—Jefferson Evans
*Attorney, Agent, or Firm*—Nixon & Vanderhye P.C.

[57] ABSTRACT

A magnetic tape drive (20) has features for counteracting inverted insertion of a tape cartridge. A loading tray (30) of the drive has a displaceable dustcover release element (72) which actuates a release lever of a dustcover of the cartridge when the cartridge is properly inserted into the tray but which displaces when an inverted cartridge is inserted into the tray. In one embodiment, the displaceable dustcover release element resiliently protrudes through an aperture (70) of a bottom wall (60) of the tray and into an interior of the tray. The tray has a bottom wall with a bottom wall edge (90) configured to extend over a dustcover lid of an inverted cartridge inserted into the tray and thereby preclude catching of the dustcover on the bottom wall. Moreover, the tray has inverted cartridge stop members (82) provided at a position to abut an inverted cartridge upon full insertion of the inverted cartridge into the tray.

30 Claims, 4 Drawing Sheets

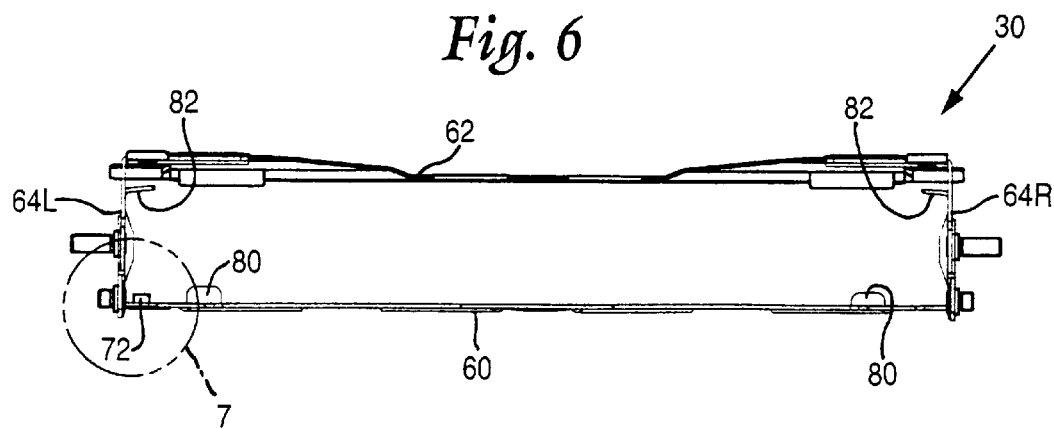
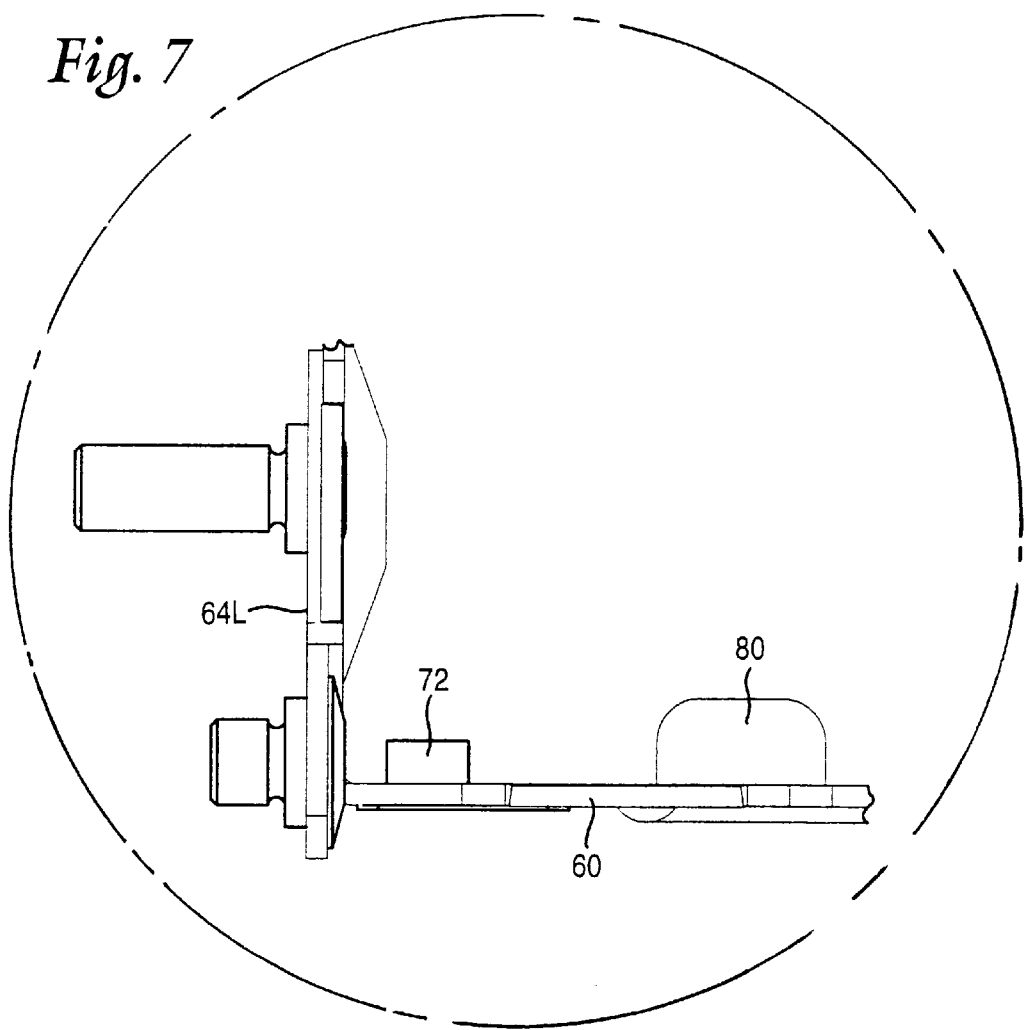

TAPE DRIVE WITH TRAY FOR COUNTERACTING INVERTED CARTRIDGE INSERTION

This application claims the benefit and priority of U.S. Provisional patent application Ser. No. 60/036,135, field Jan. 21, 1997, which is incorporated herein by reference.

BACKGROUND

1. Field of Invention

This invention pertains to tape drives which read and recording information on magnetic tape, and particularly to tape drives of the type into which cartridges of magnetic tape are insertable.

2. Related Art and Other Considerations

Tape drives which handle magnetic tape cartridges for recording and reproduction purposes typically have a loading tray or the like provided proximate the mouth of the drive for receiving the cartridge upon insertion. The tray ultimately facilitates proper positioning of the cartridge in the drive so that a dustcover of the cartridge can be automatically opened. Opening of the dustcover permits the drive to extract tape from a properly inserted cartridge into a tape path of the drive. The tape path includes a head which has one or more elements for recording magnetic flux transitions on the tape or for reading magnetic flux transitions recorded on the tape.

Tape cartridges have a small dustcover release lever provided on a side of the cartridge. Unless the dustcover release lever is tripped upon insertion of the cartridge into the drive, the cartridge dustcover will not open and the tape inside the cartridge cannot be exposed and engaged by extraction mechanisms of the drive.

Loading trays are typically metallic and have a rigid cantilever tooth extending from one edge of a bottom wall of the tray in a position to trip the dustcover release lever upon proper insertion of a cartridge into the drive. Conventionally the rigid cantilever teeth are formed integrally with the metallic bottom wall of the tray.

Unfortunately, cartridges are not always properly inserted into drives. When a cartridge is inserted upside-down into a drive, the rigid cantilever tooth snags one edge of the cartridge. Persistent shoving of the cartridge into the drive causes the cartridge to be skewed in the tray, with one edge of the cartridge being caught by the rigid cantilever tooth and an opposite edge of the cartridge abutting a stop which projects from the tray bottom wall. Withdrawal of the cartridge from the tray is complicated by the fact that a flap on the dustcover, if even slightly opened, tends to snag on an edge of the tray bottom wall. The cartridge becomes jammed in the tray, requiring patience if not expertise to resolve. Jammed cartridges hamper drive performance and waste operator time.

Accordingly, what is needed, and an object of the present invention, is a drive which counteracts inverted insertion of magnetic tape cartridges.

SUMMARY

A magnetic tape drive has features for counteracting inverted insertion of a tape cartridge. A loading tray of the drive has a displaceable dustcover release element which actuates a release lever of a dustcover of the cartridge when the cartridge is properly inserted into the tray but which displaces when an inverted cartridge is inserted into the tray. In one embodiment, the displaceable dustcover release element resiliently protrudes through an aperture of a bottom wall of the tray into an interior of the tray. The tray has a bottom wall with a bottom wall edge configured to extend over a dustcover lid of an inverted cartridge inserted into the tray and thereby preclude catching of the dustcover on the bottom wall. Moreover, the tray has inverted cartridge stop members provided at a position to abut an inverted cartridge upon full insertion of the inverted cartridge into the tray. The inverted cartridge stop members are formed at a greater distance from the mouth of the tray than are nominal cartridge stop members. The inverted cartridge stop members are preferably projections formed on sidewalls of the tray proximate a top of the sidewalls.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 6 is a front view of the cartridge loading tray of FIG. 2.

FIG. 7 is an enlarged partial front view of the cartridge loading tray of FIG. 2, showing the displaceable dustcover release element.

DETAILED DESCRIPTION OF THE DRAWINGS

In the following description, for purposes of explanation and not limitation, specific details are set forth such as particular to provide a thorough understanding of the present invention. However, it will be apparent to those skilled in the art that the present invention may be practiced in other embodiments that depart from these specific details. In other instances, detailed descriptions of well structures are omitted so as not to obscure the description of the present invention with unnecessary detail.

Figure 1:
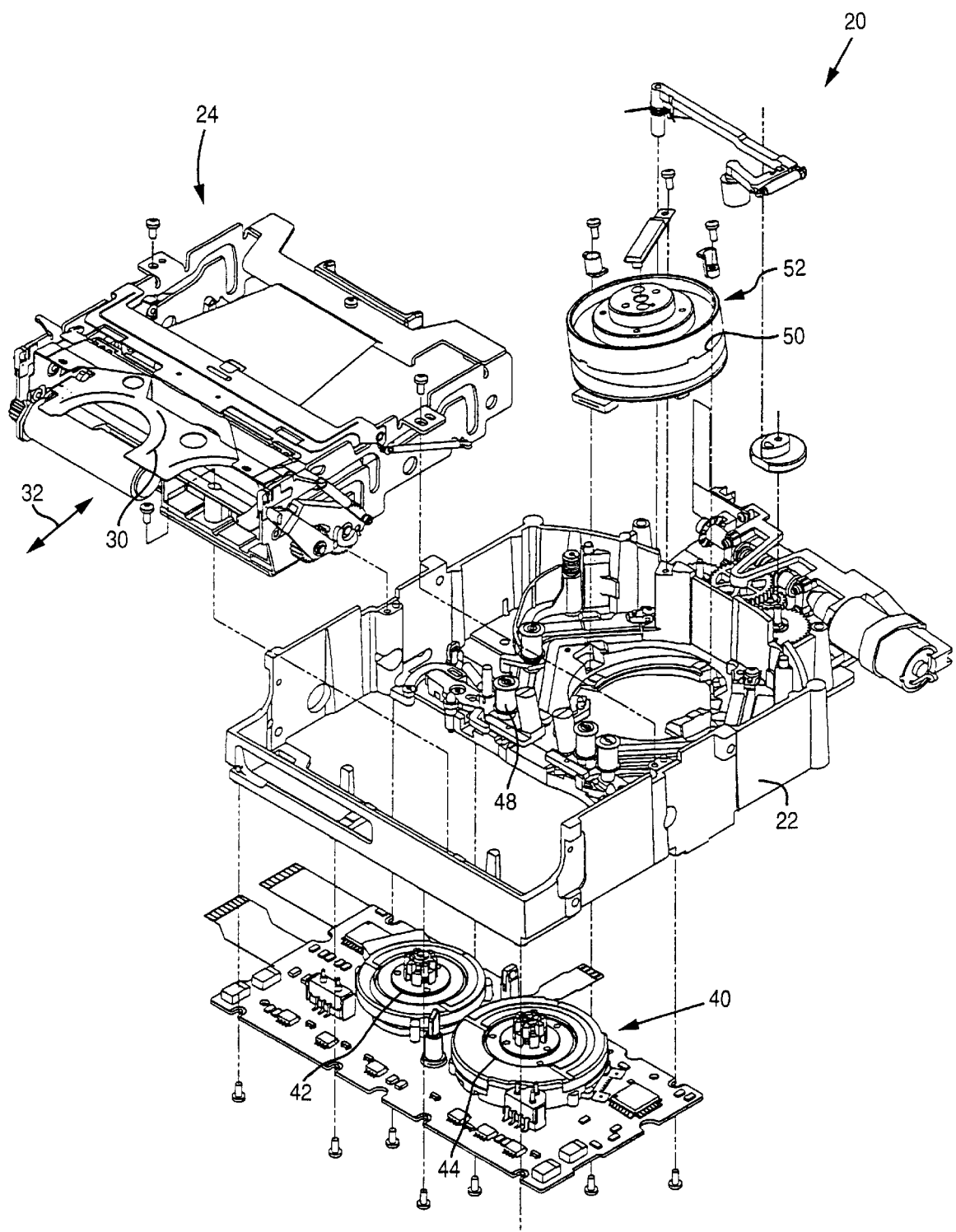
FIG. 1 is an exploded view of a magnetic tape drive according to an embodiment of the invention.

FIG. 1 shows a tape drive 20. Tape drive 20 has a frame 22 in which a cartridge loading system 24 is mounted. Cartridge loading system 24 includes a loading tray 30 which reciprocates in a direction depicted by arrow 32 toward and away from a mouth of drive 20. Also mounted to drive frame 22 is a tape transport system 40 which includes a motor-driven supply reel hub 42 and a motor-driven take-up reel hub 44. Mechanisms such as trolly-mounted rollers 48 extract tape from a cartridge and pull the tape into a tape path which includes contact with a recording/reproducing head 50. The transport system serves to provide relative motion between head 50 and the tape, e.g., linear motion ot the tape past the head.

In the illustrated embodiment, tape drive 20 is a helical scan tape drive wherein a plurality of heads 50 are mounted on a rotary drum 52, and particularly drive which handles standard 8 mm magnetic tape cartridges. one example of such a helical scan tape drive is shown in U.S. Pat. No. 5,602,694, which is entitled "Capstaniess Helical Drive System" and which is incorporated herein by reference. Although illustrated in the context of a helical scan drive, it should be understood that the features herein described for counteracting inverted cartridge insertion are not limited to helical scan drivers, but have broader applicability to other types of drives, including streaming or serpentine type drives, for example.

Loading tray 30 is shown in more detail in FIG. 2 through FIG. 8. Tray 30 has a bottom wall 60, a top wall 62, and two opposing side walls 64L, 64R. At the position where prior art trays have a rigid cantilever tooth for tripping a dustcover release lever of a cartridge, tray 30 has an aperture 70 provided in bottom wall 60. A displaceable dustcover release element 72 is mounted beneath bottom wall 60 (see FIG. 8). Release element 72 is an elongated flexible metalic strip having opposite ends thereof secured, e.g., by fasteners or welding, on opposite sides of aperture 70. At its middle, release element 72 has a dimple 74 which extends upwardly and through aperture 70. At its crest and in its natural position, dimple 74 of release element 72 extends above a top plane 76 of tray bottom wall 60 (see FIG. 5).

When a cartridge is properly inserted into tray 30, release element 72 is sufficiently strong to trip the dustcover release lever of a cartridge without falling below the level of plane 76. However, should a cartridge be inserted into tray 30 in an inverted (e.g., upside-down) position or orientation, the force of insertion will cause the top surface of the cartridge to deflect release element 72 downwardly below plane 7G. In so deflecting, release element 72 will not snag the ill-inserted cartridge.

Figure 2:
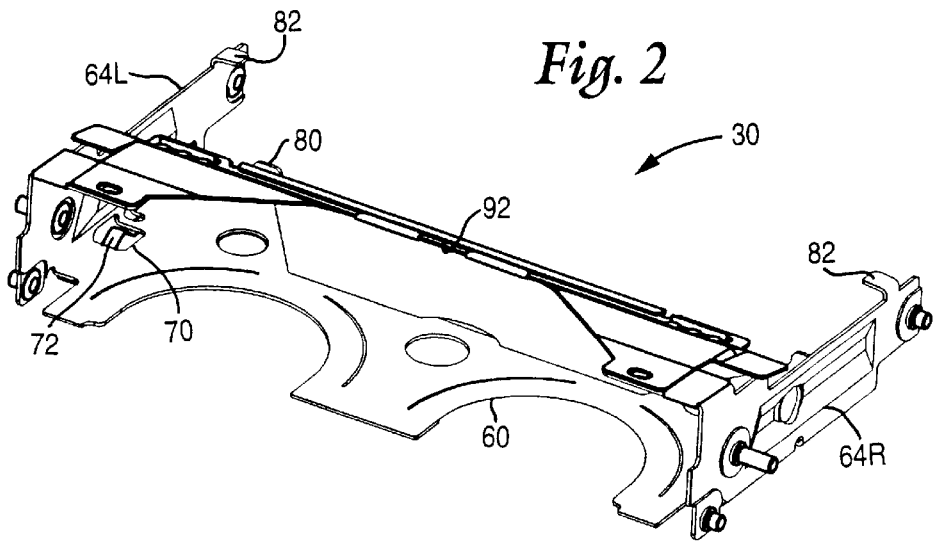
FIG. 2 is a front perspective view of a cartridge loading tray employed in the drive of FIG. 1.
Figure 3:
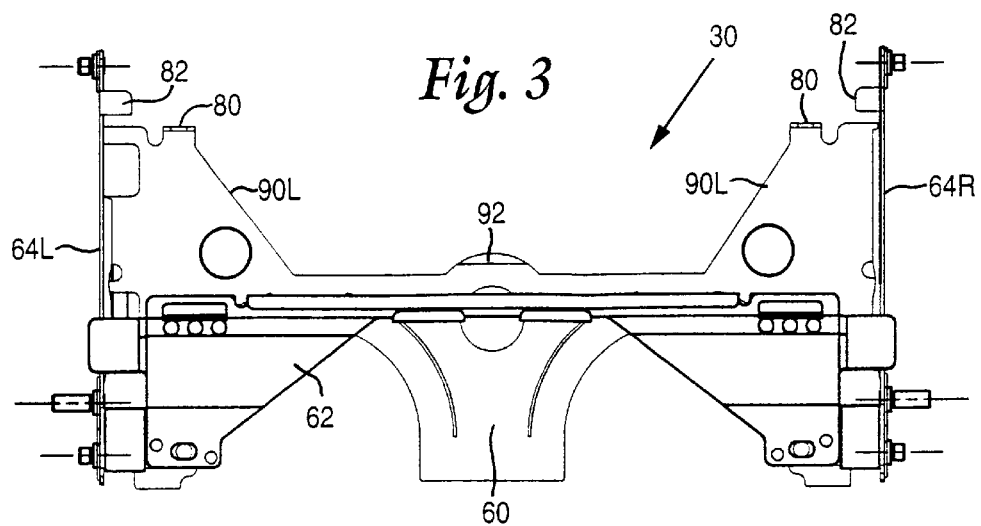
FIG. 3 is a top view of the cartridge loading tray of FIG. 2.
Figure 4:
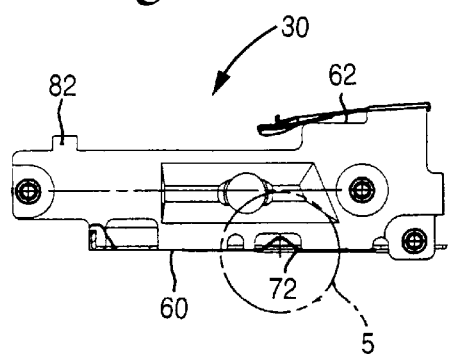
FIG. 4 is a left side view of the cartridge loading tray of FIG. 2.
Figure 5:
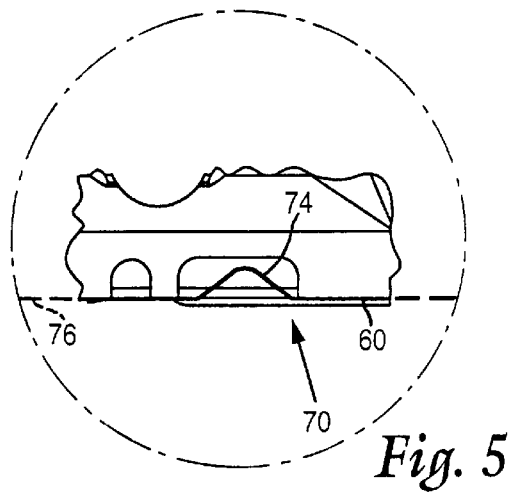
FIG. 5 is an enlarged partial left side view of the cartridge loading tray of FIG. 2, showing particularly a displaceable dustcover release element.
Figure 8:
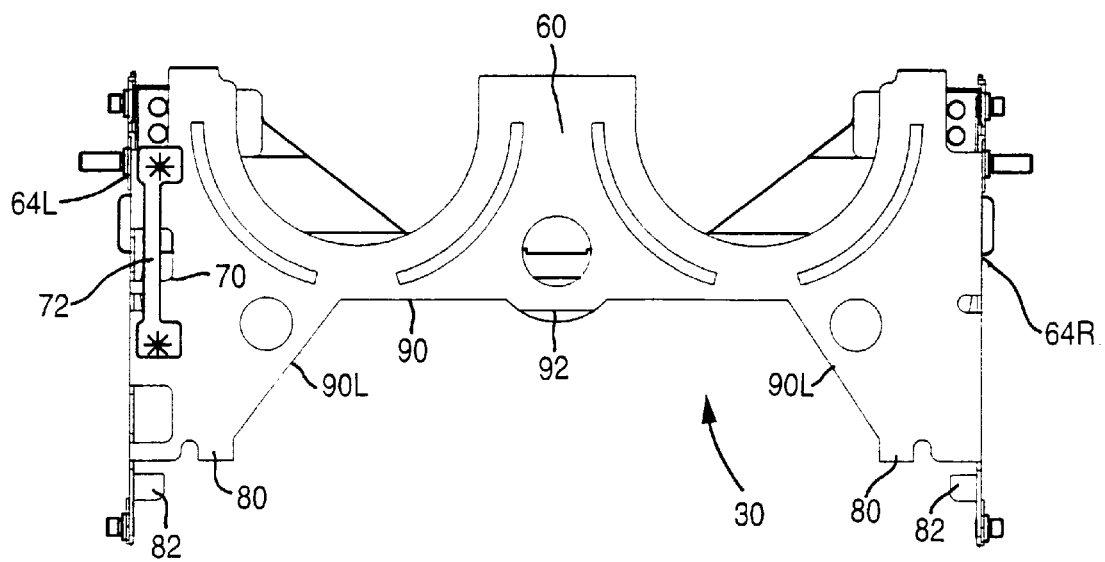
FIG. 8 is a bottom view of the cartridge loading tray of FIG. 2.

Continued insertion of the inverted cartridge into tray 30 is thus possible. Traditional or nominal cartridge stops 80 on tray bottom wall 60 will not stop rearward movement of the cartridge into tray 30 and drive 20. Stops 80 are positioned to engage a fiat leading edge of a properly inserted cartridge, not a beveled edge of an inverted cartridge. In order to allow the cartridge to be fully inserted in tray 30 without any skewing, tray 30 has a pair of inverted cartridge stop members 82 formed on opposing side walls 64L, 64R. As seen in FIG. 2 and FIG. 3, inverted cartridge stop members 82 are projections formed proximate the rear top edges of at the rear of side walis 64L, 64R. Inverted cartridge stop members 82 are integral with side walls 64L, 64R and extend into the direction of the interior of tray 30. Inverted cartridge stop members 82 are thus formed at a greater distance from the mouth of tray 30 than are the nominal cartridge stop members 80. Inverted cartridge stop members 82 are thus provided at a position to abut the inverted cartridge upon full insertion of the inverted cartridge into tray 30.

Tray bottom wall 60 has a rear edge 90 with an intermediate segment and two lateral segments 90L. The intermediate segment of rear edge 90 has a lip 92 which is bent downwardly out of the plane of bottom wall 60 and away from the interior of tray 30 (e.g., bent away from the viewer in FIG. 3). In the plane of bottom wall 60, lateral segments 90L of rear edge 90 are inclined with respect to a leading edge of the inverted cartridge. Unlike prior art trays which do not have the tapered lateral segments 90L, tray 30 does not catch or snag a flap of a dustcover lid of an inverted cartridge. Indeed, lateral segments 90L are positioned so that an edge of a flap of a dustcover lid of an inverted cartridge must always lie above segments 90L. That is, segments 90L preclude any part of the dustcover lid from extending under the plane of bottom wall 60. Thus, the dustcover cannot open beyond the plane of the bottom wall, and accordingly cannot snag on bottom wall 60.

Figure 9:
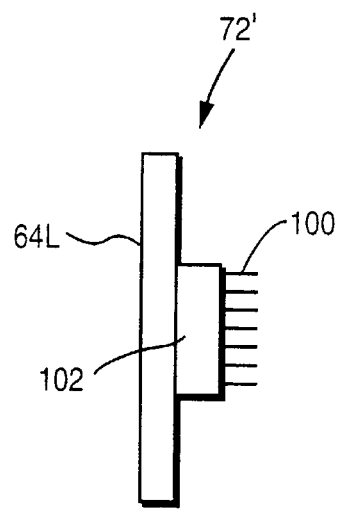
FIG. 9 is a front view of a portion of a cartridge loading tray according to another embodiment of the invention.

It should be understood that aspects of the invention can be practiced in structural forms other than those specifically described above. For example, in another embodiment shown in FIG. 9, a displaceable dustcover release element 721 comprises a set of fibers 100 mounted on left side wall 64L of a tray. The set of fibers 100 is secured to a first side of an adhesive strip 102, a second side of the adhesive strip 102 being secured to wall 64L. The set of fibers 100 has sufficient rigidity to actuate the dustcover release lever of a properly inserted cartridge, but deflect rearwardly upon insertion of an inverted cartridge into the tray.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A drive for selectively recording information on and reproducing information from magnetic tape housed in a tape cartridge, the drive comprising:
   a drive frame;
   a cartridge loading tray internally mounted in the frame for receiving a cartridge upon insertion of the cartridge into the drive;
   a head having an element for selectively recording information on and reading information from tracks on the tape;
   a transport for providing relative motion between the head and the tape;
      wherein the tray has a displaceable dustcover release element which actuates a release lever of a dustcover of the cartridge when the cartridge is properly inserted into the tray but which displaces when the cartridge is inserted into the tray in an inverted position.

2. The apparatus of claim 1, wherein the tray has a wall with an aperture provided therein, and wherein the displaceable dustcover release element resiliently protrudes through the aperture into an interior of the tray.

3. The apparatus of claim 1, wherein the wall is a tray bottom wall.

4. The apparatus of claim 1, wherein the dustcover release element is situated relative to the tray whereby upon contact with the cartridge the dustcover release element responds to an insertion force of a properly inserted cartridge by actuating the release lever of the dustcover but responds to an insertion force of an inverted cartridge by the release element displacing to an inoperative position.

5. The apparatus of claim 4, wherein the dustcover release element is an elongated flexible metal strip having opposite ends secured on opposite sides of an aperture formed in the tray, the release element having a dimple which extends through the aperture into an interior of the tray.

6. The apparatus of claim 1, wherein the dustcover release element is a flexible member having a degree of flexibility which enables the release element to actuate a release lever of the dustcover of the cartridge upon receipt of an insertion force of a properly inserted cartridge but which causes the release element to displace to an inoperative position upon receipt of an insertion force of an inverted cartridge which contacts the release element.

7. The apparatus of claim 1, wherein the dustcover release element is an elongated flexible metal strip having opposite ends secure on opposite sides of an aperture formed in the tray, the release element having a dimple which extends through the aperture into an interior of the tray.

8. A drive for selectively recording information on and reproducing information from magnetic tape housed in a tape cartridge, the drive comprising:
   a drive frame;
   a cartridge loading tray internally mounted in the frame for receiving a cartridge upon insertion of the cartridge into the drive;
   a head having an element for selectively recording information on and reading information from tracks on the tape;
   a transport for providing relative motion between the head and the tape; wherein the tray has a displaceable dustcover release element which actuates a release lever of a dustcover of the cartridge when the cartridge is properly inserted into the tray but which displaces when an inverted cartridge is inserted into the tray;
   wherein the displaceable dustcover release element comprises a set of fibers mounted on a wall of the tray.

9. The apparatus of claim 8, wherein the set of fibers is secured to a first side of an adhesive, a second side of the adhesive being secured to the wall.

10. The apparatus of claim 8, wherein the wall is a sidewall of the tray.

11. A drive for selectively recording information on and reproducing information from magnetic tape housed in a tape cartridge into the drive;
   a drive frame;
   a cartridge loading tray internally mounted in the frame for receiving a cartridge upon insertion of the cartridge into the drive;
   a head having an element for selectively recording information on and reading information from tacks on the tape;
   a transport for providing relative motion between the head and the tape;
      wherein the tray has an inverted cartridge stop member provided thereon at a position to abut an inverted cartridge upon full insertion of the inverted cartridge into the tray.

12. The apparatus of claim 11, wherein the inverted cartridge stop member is formed on a sidewall of the tray.

13. The apparatus of claim 11, wherein the inverted cartridge stop member is a projection.

14. The apparatus of claim 11, wherein the inverted cartridge stop member is a projection formed on a sidewall of the tray proximate a top of the sidewall.

15. A drive for selectively recording information on and reproducing information from magnetic tape housed in a tape cartridge into the drive;
   a drive frame;
   a cartridge loading tray internally mounted in the frame for receiving a cartridge upon insertion of the cartridge into the drive;
   a head having an element for selectively recording information on and reading information from tacks on the tape;
   a transport for providing relative motion between the head and the tape;
      wherein the tray has an inverted cartridge stop member provided thereon at a position to abut an inverted cartridge upon full insertion of the inverted cartridge into the tray;
      wherein the tray has a nominal cartridge stop member on a first wall of the tray and the inverted cartridge stop member is on a second wall of the tray, and wherein the inverted cartridge stop member is formed at a greater distance from the mouth of the tray that the nominal cartridge stop member.

16. The apparatus of claim 15, wherein the inverted cartridge stop member is formed on a sidewall of the tray.

17. The apparatus of claim 15, wherein the inverted cartridge stop member is a projection.

18. The apparatus of claim 15, wherein the inverted cartridge stop member is a projection formed on a sidewall of the tray proximate a top of the sidewall.

19. A drive for selectively recording information on and reproducing information from magnetic tape housed in a tape cartridge, the drive comprising:
   a drive frame;
   a cartridge loading tray internally mounted in the frame for receiving a cartridge upon insertion of the cartridge into the drive;
   a head having an element for selectively recording information on and reading information from tracks on the tape;
   a transport for providing relative motion between the head and the tape;
   wherein the tray comprises:
      a displaceable dustcover release element which actuates a release lever of a dustcover of the cartridge when the cartridge is properly inserted into the tray but which displaces when an inverted cartridge is inserted into the tray;
      a bottom wall with a bottom wall edge configured to extend over a dustcover lid of an inverted cartridge inserted into the tray and thereby preclude catching of the dustcover on the bottom wall; and
      an inverted cartridge stop member provided thereon at a position to abut an inverted cartridge upon full insertion of the inverted cartridge into the tray.

20. The apparatus of claim 19, wherein the tray has a wall with an aperture provided therein, and wherein the displaceable dustcover release element resiliently protrudes through the aperture into an interior of the tray.

21. The apparatus of claim 19, wherein the wall is a tray bottom wall.

22. The apparatus of claim 19, wherein the displaceable dustcover release element comprises a set of fibers mounted on a wall of the tray.

23. The apparatus of claim 19, wherein the tray has a nominal cartridge stop member on a first wall of the tray and the inverted cartridge stop member is on a second wall of the tray, and wherein the inverted cartridge stop member is formed at a greater distance from the mouth of the tray that the nominal cartridge stop member.

24. The apparatus of claim 23, wherein the inverted cartridge stop member is formed on a sidewall of the tray.

25. The apparatus of claim 23, wherein the inverted cartridge stop member is a projection.

26. The apparatus of claim 23, wherein the inverted cartridge stop member is a projection formed on a sidewall of the tray proximate a top of the sidewall.

27. The apparatus of claim 19, wherein the dustcover release element is situated relative to the tray whereby upon contact with the cartridge the dustcover release element responds to an insertion force of a properly inserted cartridge by actuating the release lever of the dustcover but responds to an insertion force of an inverted cartridge by the release element displacing to an inoperative position.

28. The apparatus of claim 27, wherein the dustcover release element is an elongated flexible metal strip having opposite ends secure on opposite sides of an aperture formed in the tray, the release element having a dimple which extends through the aperture into an interior of the tray.

29. The apparatus of claim 19, wherein the dustcover release element is a flexible member having a degree of flexibility which enables the release element to actuate a release lever of the dustcover of the cartridge upon receipt of an insertion force of a properly inserted cartridge but which causes the release element to displace to an inoperative position upon receipt of an insertion force of an inverted cartridge which contacts the release element.

30. The apparatus of claim 19, wherein the dustcover release element is an elongated flexible metal strip having opposite ends secure on opposite sides of an aperture formed in the tray, the release element having a dimple which extends through the aperture into an interior of the tray.

* * * * *